United States Patent
Zametzer et al.

(10) Patent No.: US 9,326,443 B2
(45) Date of Patent: May 3, 2016

(54) ARRANGEMENT AND METHOD FOR THE AUTOMATIC TRANSFER OF CROPS FROM A HARVESTING MACHINE TO A TRANSPORT VEHICLE

(75) Inventors: Johannes Zametzer, Zweibruecken (DE); Folker Beck, Rieschweiler (DE)

(73) Assignee: DEERE & COMPANY, Moline, IL (US)

( * ) Notice: Subject to any disclaimer, the term of this patent is extended or adjusted under 35 U.S.C. 154(b) by 542 days.

(21) Appl. No.: 13/600,840

(22) Filed: Aug. 31, 2012

(65) Prior Publication Data

US 2013/0227922 A1 Sep. 5, 2013

(30) Foreign Application Priority Data

Sep. 2, 2011 (DE) .......................... 10 2011 082 052

(51) Int. Cl.
| | | |
|---|---|---|
| *A01D 43/08* | (2006.01) | |
| *A01D 41/127* | (2006.01) | |
| *A01B 69/04* | (2006.01) | |
| *A01D 43/073* | (2006.01) | |

(52) U.S. Cl.
CPC ............ *A01D 41/127* (2013.01); *A01B 69/008* (2013.01); *A01D 43/073* (2013.01); *A01D 43/087* (2013.01)

(58) Field of Classification Search
USPC ........... 56/10.2 R, 10.2 A, 10.2 F, 13.3, 16.6; 460/1, 23, 114, 115; 701/50; 703/7, 8
See application file for complete search history.

(56) References Cited

U.S. PATENT DOCUMENTS

| | | | |
|---|---|---|---|
| 6,553,299 B1* | 4/2003 | Keller et al. ..................... 701/50 |
| 6,682,416 B2* | 1/2004 | Behnke et al. ................. 460/114 |
| 7,537,519 B2* | 5/2009 | Huster et al. .................. 460/114 |
| 7,725,233 B2* | 5/2010 | Hendrickson et al. .......... 701/50 |
| 7,798,894 B2* | 9/2010 | Isfort ............................. 460/114 |
| 8,145,393 B2* | 3/2012 | Foster et al. .................... 701/50 |
| 8,380,401 B2* | 2/2013 | Pighi et al. ...................... 701/50 |
| 8,428,829 B2 | 4/2013 | Brunnert et al. |
| 2003/0140774 A1* | 7/2003 | Malakatas ..................... 89/41.01 |
| 2009/0044505 A1* | 2/2009 | Huster et al. .............. 56/10.2 R |

FOREIGN PATENT DOCUMENTS

| | | |
|---|---|---|
| DE | 4426059 | 2/1996 |
| DE | 102009027245 | 12/2010 |
| EP | 0843960 | 8/1997 |
| EP | 1344445 | 2/2003 |

* cited by examiner

*Primary Examiner* — Alicia Torres

(57) ABSTRACT

An arrangement for the automatic transfer of agricultural crops from a harvesting machine to a transport vehicle has an image capture device, which optically detects one or more features of the transport vehicle. A computer controls an actuator to adjust a transfer device relative to the harvesting machine and/or to change the position of the loading container relative to the harvesting machine based on signals of the image capture device. The computer continually sets up, with the aid of the signals of the image capture device, a virtual movement model of the loading container and controls the actuator with the aid of extrapolated data for an expected position of the loading container derived from the movement model, if the signals of the image capture device are no longer sufficient to recognize the transport vehicle because of an impairment of the visibility conditions.

11 Claims, 5 Drawing Sheets

ARRANGEMENT AND METHOD FOR THE AUTOMATIC TRANSFER OF CROPS FROM A HARVESTING MACHINE TO A TRANSPORT VEHICLE

FIELD OF THE DISCLOSURE

The disclosure concerns an arrangement for the automatic transfer of agricultural products from a harvesting machine to a transport vehicle, with a transfer device of the harvesting machine. The transfer device is adapted and can be operated so as to discharge crops from the harvesting machine onto a loading container of the transport vehicle. An image capture device of the harvesting machine is adapted and can be operated to optically detect one or more features of the transport vehicle. A computer, with the transmission of signals, is connected to the image capture device and programmed to control at least one actuator for the adjustment of the transfer device relative to the harvesting machine, and/or for the change of the position of the loading container relative to the harvesting machine based on the signals of the image capture device, in such a way that the crops arrive at the loading container. The disclosure also concerns a corresponding method.

BACKGROUND OF THE DISCLOSURE

When harvesting crops from agriculturally cultivated plants in a field, it is common practice for a harvesting machine to load a transport vehicle with harvested crops that moves next to the harvesting machine. A loading container of the transport vehicle, for example a tractor with a trailer or a truck is loaded by a transfer device of the harvesting machine, with the harvested crops, while the harvesting machine is moving about, for example with a forage harvester, through a discharge chute, and with a combine harvester, through a discharge spout. The transfer device is typically affixed on the harvesting machine around a vertical axis, so that it can rotate and swivel between a position at rest, in which it is oriented more or less parallel to the longitudinal axis of the harvesting machine, and a working position, in which it extends transverse to the direction of movement of the harvesting machine. In addition, the height of the discharge end of the transfer device can be varied, as well as the position of a discharge flap, which defines the angle at which the harvested crops are discharged.

With transfer devices that cannot be adjusted in their discharge position, as they are usually found on combine harvesters, the driver of the transport vehicle has to ensure that the filling of the loading container is uniform and complete by gradually putting the loading container beneath the loading device in different positions. This task is relatively demanding and tiring, since crop losses due to the crops failing on the field are to be avoided.

With adjustable loading devices as they are typically found on forage harvesters, the position of the transfer device is, in the simplest case, manually controlled by the driver of the harvesting machine, for which purpose input devices are available in the cabin, which control the actuators used to adjust the transfer device. The driver of the harvesting machine has to ensure that the entire loading container of the transport vehicle is sufficiently filed, which takes place by the successive alignment of the transfer device at different points on the loading container. If the transport vehicle should deviate forwards or backwards or to the site from its target position, the position of the transfer device has to be readjusted manually. It is disadvantageous that the control of the position of the transfer device takes up a considerable part of the attention of the driver, which leads to tiring work for the driver of the harvesting machine.

In order to avoid this disadvantage, systems have been proposed for the automatic filling of the trailer, which detect the optical features of the loading container by way of a camera and automatically adjust the position of the transfer device in such a way that the crops reach the loading container (DE 44 26 059 A1, EP 0 843 960 A1, EP 1 344 445 A1, and DE 10 2009 027 245 A1).

However, situations are conceivable in which such optical systems reach their limits-namely, in dusty environments, in poor lighting, or with obstacles between the camera and the loading container. In the state of the art, these systems immediately fail after an image that can be evaluated is no longer discernible, whereupon the operator of the harvesting machine has to switch to manual control of the transfer device so as to continue the harvesting operation. In switching to manual control, losses are, however hardly avoidable.

SUMMARY OF THE DISCLOSURE

The problem to be solved by the present disclosure is to be found in making available an arrangement and a method for the automatic transfer of harvest from a harvesting machine to a transport vehicle with an optical detection of the transport vehicle, which even with a short-term impairment of the optical detection of the transport vehicle, continues to remain ready-to-operate.

An arrangement for the automatic transfer of agricultural crops from a harvesting machine onto a transport vehicle comprises a transfer device on board the harvesting machine, which in the harvesting operation, discharges crops from the harvesting machine into a loading container of the transport vehicle. The harvesting machine is also provided with an image capture device, which optically detects one or more features of the transport vehicle (in particular, the loading container). A computer is connected to the image capture device, with a transmission of signals, and controls an actuator for the adjustment of the position of the transfer device relative to the harvesting machine, and/or an actuator to change the position of the loading container relative to the harvesting machine (or conversely, that is, to change the position of the harvesting machine relative to the loading container), based on signals of the image capture device, in such a way that the crops arrive at the loading container. Using the signals of the image capture device, the computer continually sets up a virtual movement model of the loading container, in the case that the signals of the image capture device are no longer sufficient for recognition of the transport vehicle because of a temporary impairment of visibility conditions, the computer device guides the actuator with the aid of extrapolated data for an expected position of the loading container, derived from the movement model.

In other words, a continuously updated, movement model is present in the computer, and indicates where the loading container is located and the manner in which it is moving.

This movement model is set up with the aid of the signals of the image capture device, if the image capture device delivers signals from which the position of the transport vehicle and, in particular, the loading container can no longer be derived, the computer has recourse to the movement model, so as to be able to derive the expected position and to continue to guide the actuator automatically. In this way, short-term disturbances of the image capture device, which can arise, for example, due to rising dust or obstacles between the image capture device and the transport vehicle, can be bridged without any loss in function of the automatic transfer arrangement.

The image capture device is preferably placed on the transfer device. In order to take into consideration the relative position of the image capture device relative to the harvesting machine during the setup of the movement module, the computer in this embodiment is connected by a transmission of signals to sensors to detect the alignment of the transfer device relative to the harvesting machine. Furthermore, the computer can be supplied with information for the up-to-date speed of the harvesting machine. Thus, the movement model can include, in addition to the relative position of the loading container with respect to the harvesting machine, the up-to-date speed of the loading container relative to the ground— with a simple embodiment, only the speed in the forward direction of the harvesting machine and with a more developed embodiment, also the speed that is transverse to the forward direction of the harvesting machine. Furthermore, the movement model can also include the acceleration of the loading container—in turn, with a simple embodiment, only in the forward direction of the harvesting machine and with a more developed embodiment, also transverse to the forward direction of the harvesting machine.

The computer can set up the movement model, using a so-called Kalman filter. With the aid of the historical data of the image capture device, such a filter calculates the most probable actual position of the loading container, wherein a covariance matrix can be developed as a measure of the inaccuracy of the position determination.

With the evaluable signals of the image capture device, the computer can also control the actuator with the aid of data derived from the movement model. In the case of unfavorable visibility conditions, in which features of the transport vehicle or the loading container can be identified poorly, the computer (in particular, the Kalman filter) smoothes the jumps in the position data of the loading container produced with the aid of the signals of the image capture device, which arise as a result of the poor images. From the movement mode, the computer can also derive at which point of an image detected by the image capture device, an identifiable feature of the loading container would have to be located and preferably search there for the identifiable feature. In this way, the image processing time can be shortened.

BRIEF DESCRIPTION OF THE DRAWINGS

An embodiment of the disclosure is described in detail below with reference to the accompanying drawings wherein.

DETAILED DESCRIPTION OF THE DRAWINGS

Figure 1:
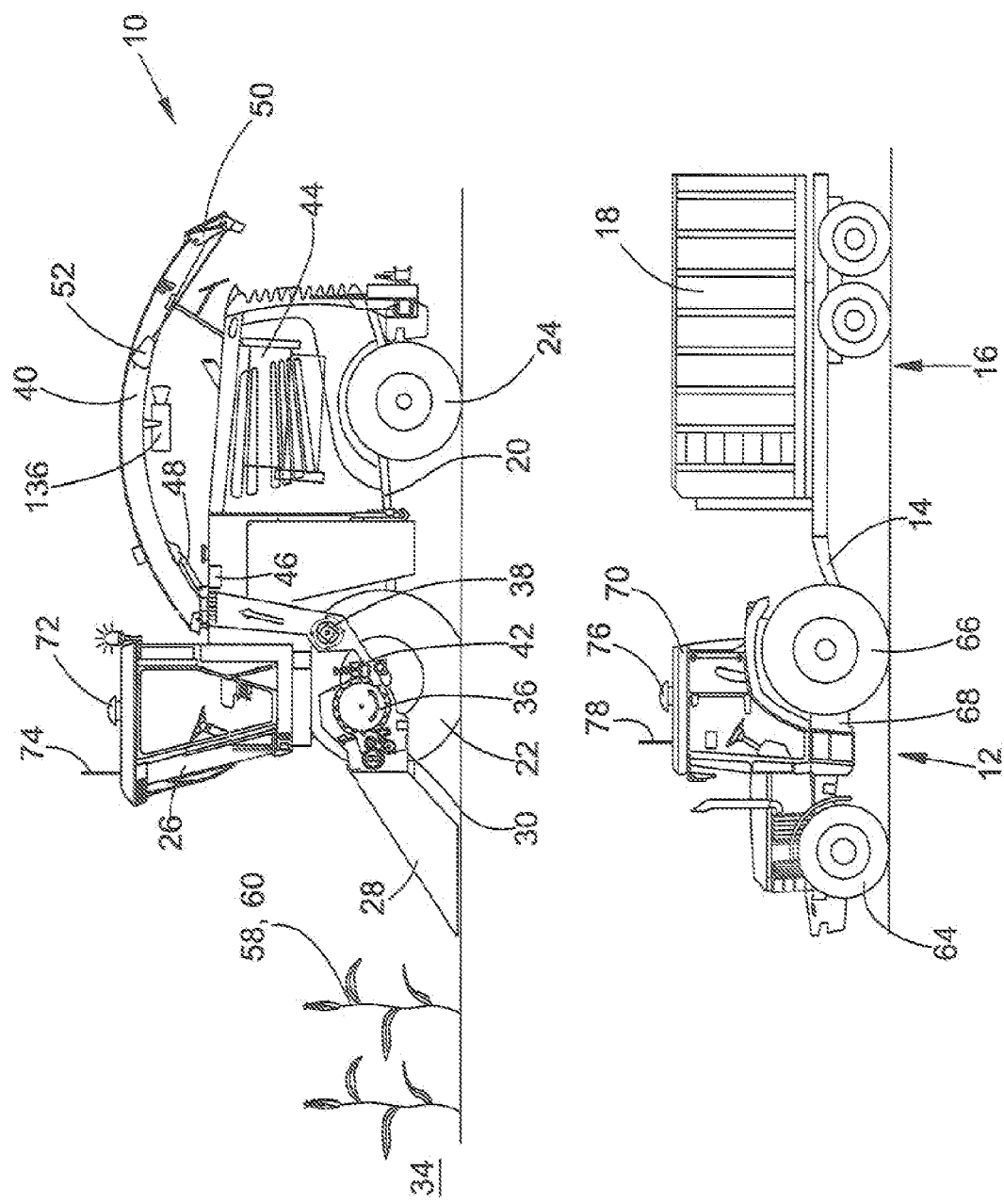
FIG. 1 is a side view of a self-propelled harvesting machine and a transport vehicle.

A combination of two agricultural machines shown in FIG. 1 comprises a self-propelled harvesting machine 10 in the form of a forage harvester and a transport vehicle 12 in the form of a self-propelled tractor, which, by way of a tow bar 14 pulls a trailer 16, which comprises a loading container 18.

The harvesting machine 10 has a frame 20, which is carried by front-driven wheels 22 and steerable rear wheels 24. The harvesting machine 10 is operated from a driver's cabin 26, from which one can see a harvesting attachment 28, in the form of a corn header attachment, which is affixed to an entry channel 30 on the front side of the forage harvester 10. Crops harvested from a field 34 by way of the harvesting attachment 28 are conveyed to a chopper drum 36 via a gathering conveyor with pre-compression rollers located in the entry channel 30; the chopper chops them into small pieces and delivers them to a discharge accelerator 38. A subsequent processing device 42 with two grain processing rollers extends between the chopper drum 36 and the discharge accelerator 38. The driving of the aforementioned drivable units of the harvesting machine 10 and the harvesting attachment 28 takes place by way of a combustion engine 44. The crops discharged from the discharge accelerator 38 exit the harvesting machine 10 to the loading container 18 that is moving alongside, via a transfer device 40 in the form of a discharge manifold, which can be rotated around a more or less vertical axis by way of a first power-controlled actuator 46 and can be adjusted at an angle by way of a second power-controlled actuator 48; the discharge direction can be changed by way of a flap 50, the angle of which can be adjusted by way of a third power-controlled actuator 52.

The transport vehicle 12 and the trailer 16 have a conventional structure. The transport vehicle 12 comprises front, steerable wheels 64 and rear, driven wheels 66, which are supported on a carrying structure 68, which carries a drivers cabin 70.

Figure 2:
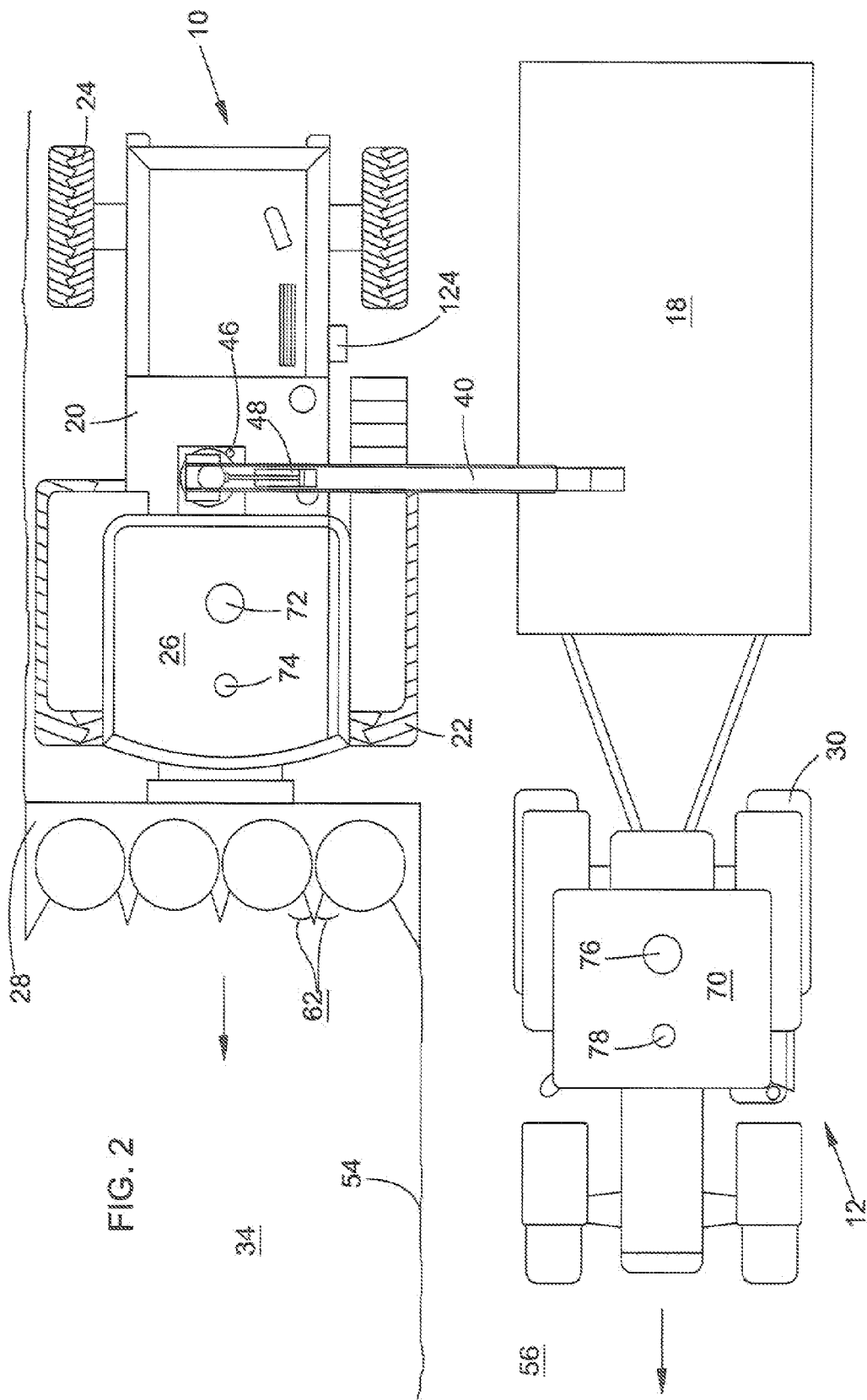
FIG. 2 is a schematic top view of the harvesting machine and the transport vehicle, which jointly carry out a harvesting and transferring operation on a field.

FIG. 2 shows the harvesting machine 10 and the transport vehicle 12 in a top view. One can see that the harvesting machine 10 is moving along the edge 54 of some crops, with represents a border between the harvested area 56 of the field 34 and the still standing growth 80 consisting of corn plants 58 of the field 34, and is reaping the crops from the plants 58. The transport vehicle 12 is moving on the harvested art 56 of the field, parallel to the harvesting machine 10, along a path on which the plants chopped by the harvesting machine 10 arrive at the loading container 18 by way of the transfer device 40. The transport vehicle 12 must therefore always move parallel next to the harvesting machine 10; in particular when entering the field, the transport vehicle 12, however, can also move behind the harvesting machine 10, since there is no harvested part 56 of the field 34 on which the transport vehicle 12 could move without damaging the plants standing there.

The harvesting machine 10 is steered by a driver sitting in the drivers cabin 1 or by a steering device, which operates automatically. The transport vehicle 12 is equipped with a steering device, which is described in more detail below, so as to facilitate or automate the parallel movement relative to the harvesting machine 10, and which can be omitted. The harvesting machine 10 could also be any other self-propelling harvesting machine, such as a combine harvester or beet harvester.

The harvesting machine 10 is equipped with a first, position-determining device 72, which is located on the roof of the cabin 26. A first radio antenna 74 is also positioned there. The transport vehicle 12 is equipped with a second position-determining device 76, which is located on roof of the cabin 70. A second radio antenna 78 is also located there.

Figure 3:
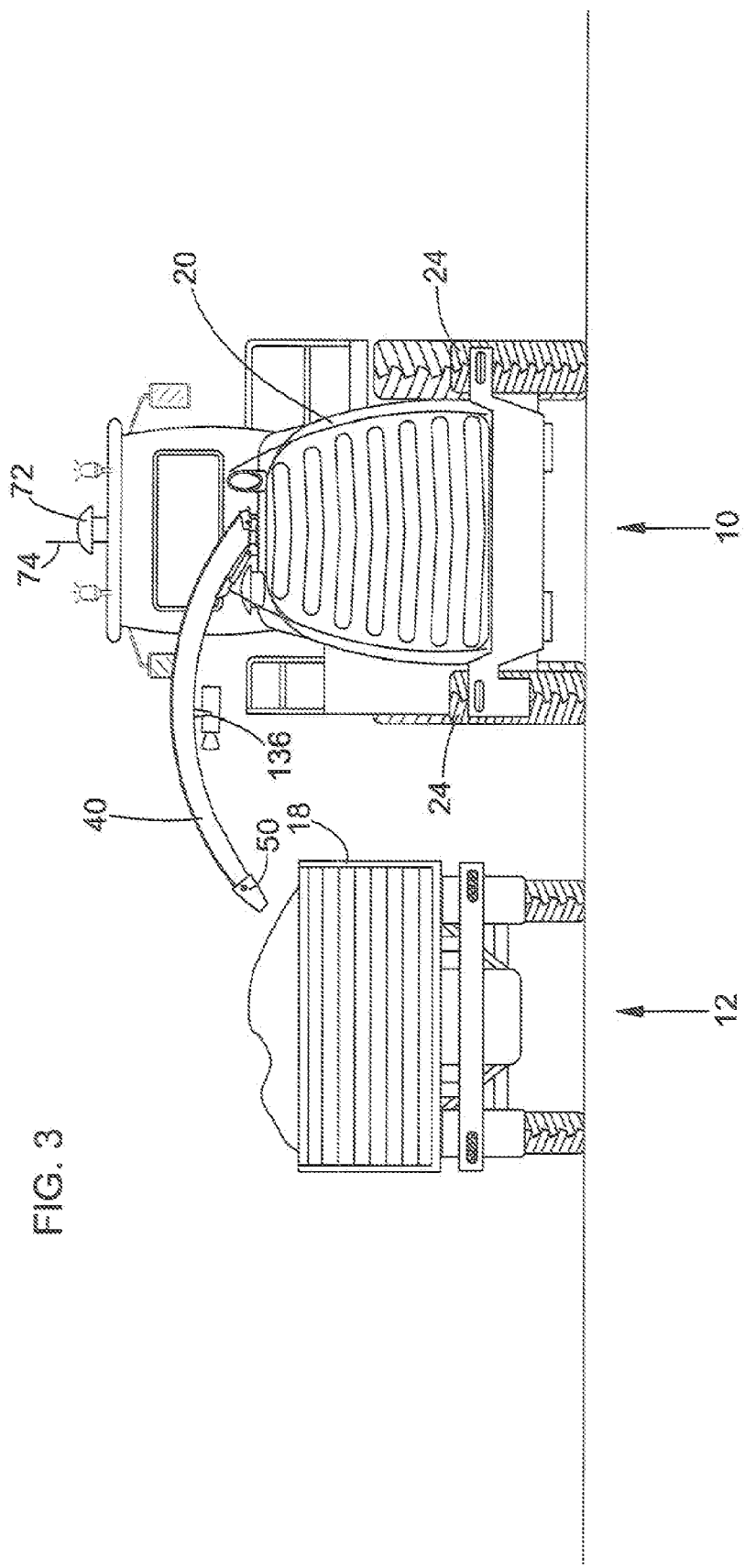
FIG. 3 is a schematic backward view of the harvesting machine and the transport vehicle during the transfer operation.

FIG. 3 shows a rear view of the harvesting machine 10 and the transport vehicle 12 with the loading container 18 and a crop cone forming on it.

Figure 4:
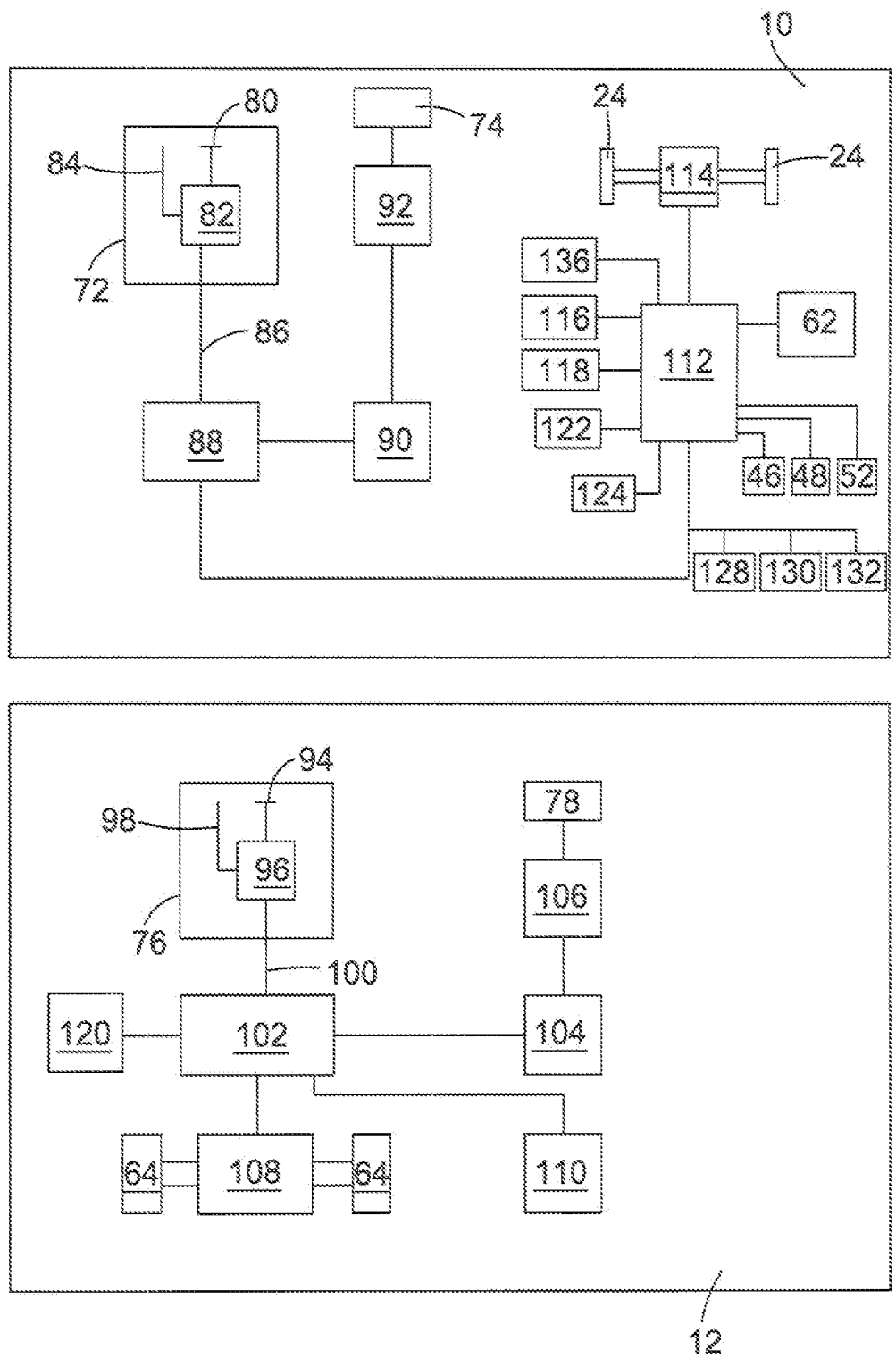
FIG. 4 is a schematic representation of the position-determining devices of the two vehicles and the interacting elements; and, FIG. 5 is a flow diagram according to which the computer of the harvesting machine functions.

Now, reference is made to FIG. 4, in which among other things, the individual components of the position-determining devices 72, 76, a computer 112, actuators 46, 48, 52 for the adjustment of the transfer device 40, sensors 128-132 for the detection of their actual position and the steering devices of the transport vehicle 12 and the harvesting machine 10 are schematically shown.

The first position-determining device 76 is on board the harvesting machine 10 and comprises an antenna 80 and an evaluation circuit 82, which is connected to the antenna 80. The antenna 80 receives signals from satellites of a position-determining system, such as GPS, Galileo; or Glonass, which are supplied to the evaluation circuit 82. With the aid of the signals of the satellites, the evaluation circuit 82 determines the actual position of the antenna 80. The evaluation circuit 82 is also connected to a correction data-receiving antenna 84, which receives radio waves radiated from reference stations at known sites. With the aid of the radio waves, correction data for the improvement of the accuracy of the position-determining device 72 are produced by the evaluation circuit 82. The evaluation circuit 82 transmits its position data by way of a bus line 86 to a control device 88.

The control device 88 is connected via an interface 90 to a reception and transmission device 92, which is in turn connected to the radio antenna 74. The reception and transmission device 92 receives and generates radio waves, which are picked up and radiated by the antenna 74. Analogously, the second position-determining device 76 is located on board the transport vehicle 12; it comprises an antenna 94 and an evaluation circuit 96, which is connected to the antenna 94. The antenna 94 receives signals from satellites of the same position-determining system as the antenna 80, which are supplied to the evaluation circuit 96. With the aid of the signals of the satellites, the evaluation circuit 86 determines the actual position of the antenna 94. The evaluation circuit 96 is also connected to a correction data-receiving antenna 98, which receives radio waves radiated from reference stations at known sites. With the aid of the radio waves, correction data for the improvement of the accuracy of the position-determining device 76 are generated by the evaluation circuit 96.

By way of a bus line 100, the evaluation circuit 96 transmits its position data to a control device 102. The control device 102 is connected via an interface 104 to a reception and transmission device 106, which in turn is connected to the radio antenna 78. The reception and transmission device 106 receives and generates radio waves, which are picked up and radiated by the antenna 78. By the reception and transmission devices 90, 106 and the radio antennae 74, 78, it is possible to transmit data from the control device 88 to the control device 102 and vice-versa. The connection between the radio antennae 74, 78 can be direct, for example, in a permissible radio range, such as CB radio, or something similar, or made available via one or more relay stations, for example, if the reception and transmission devices 90, 106 and the radio antennae 74, 78 work according to the GSM or the UMTS standard or another suitable standard for mobile telephones.

The control device 102 is connected to a steering device 108, which controls the steering an of the front, steerable wheels 84.

Furthermore, the control device 102 sends speed signals to a speed specification device 110, which, via a variation of the engine rpm of the transport vehicle 12 an/or the gear transmission, controls the speed of the transport vehicle 12. Moreover, the control device 102 is connected to a permanent storage unit 120.

On board the harvesting machine 10, the control device 88 is connected to a computer 112, which, together with the actuators it controls and the sensors connected to it, forms a control arrangement for the control of the transfer of the crops from the harvesting machine 10 to the loading container 18 of the transport vehicle 12. The computer 112 is connected to a steering device 114 which controls the steering angle of the rear, steerable wheels 24. Furthermore, the computer 112 sends speed signals to a speed specification device 116, which, via a variation of the gear transmission, controls the speed of the harvesting machine 10. The computer 112 is also connected to a throughput sensor 118, which detects the distance between the pre-compression rollers in the entry channel 30, with a sensor for the detection of the position of sensor bands 62 placed on a disk tip of the harvesting attachment 28, a permanent storage unit 122, via valve devices (not shown) with the actuators 46, 48, and 50 and with sensors 128, 130, 132, which respectively detect the position of one of the actuators 46, 48, and 50, and with an optical image capture device 136, which is placed more or less in the middle of the transfer device 40 on its underside, and during the harvesting operation, is aligned on the loading container 18 and is preferably implemented as a stereo-camera.

Figure 5:
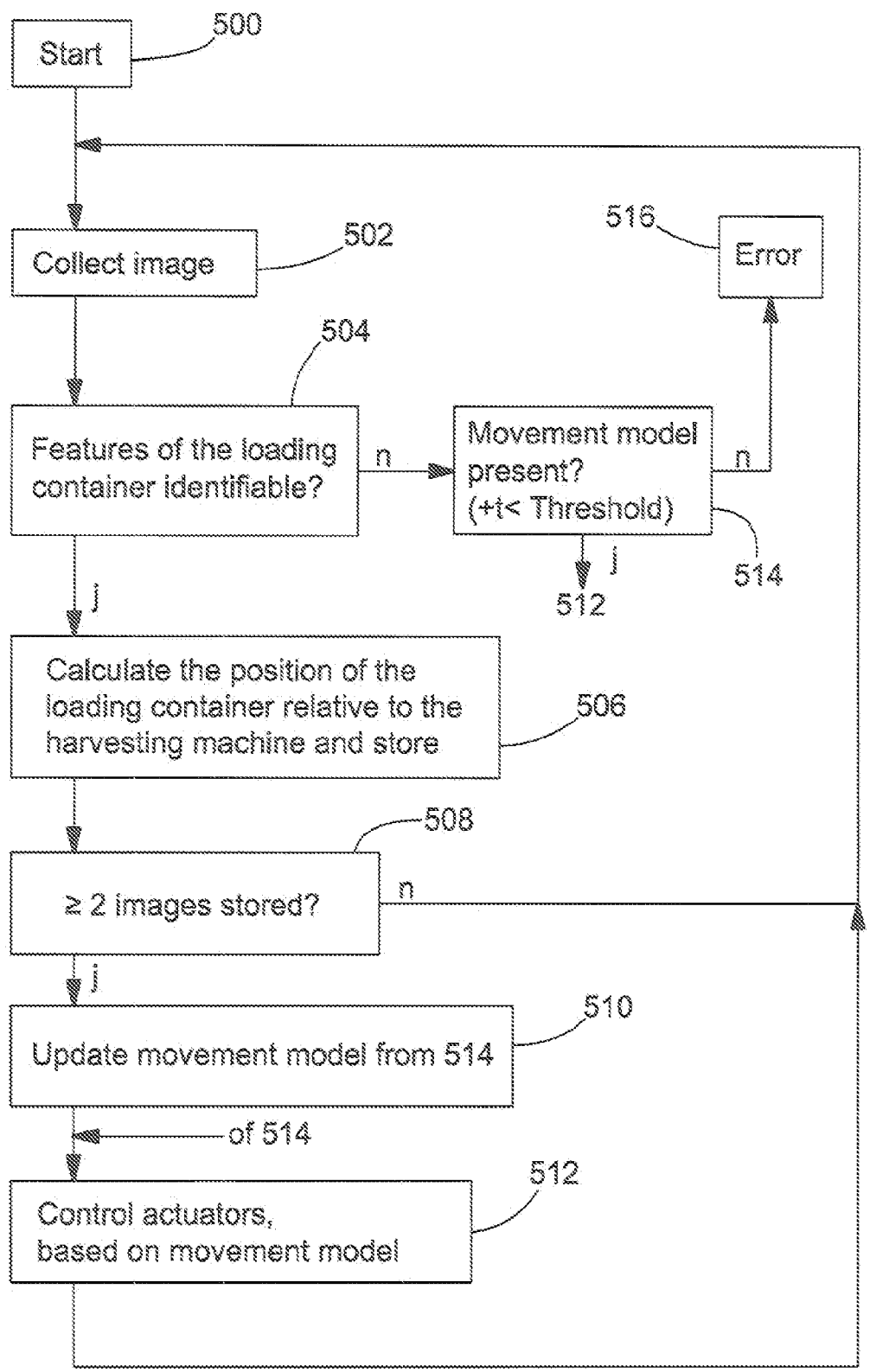

FIG. 5 shows a flow diagram, according to which the computer 112 of the harvesting machine 10 moves forward during the harvesting operation. From this, it is assumed that by a suitable actuation of manual input elements, the actuators 46, 48, and 62, the operator has brought the transfer device 40 to a position in which the crops arrive at the loading container 18, or that the harvesting machine 10 and the transport vehicle 12 are initially available for the reception of automatic control of the transfer of the crops, so that the transfer device 40 can be aligned on the loading container without any loss of crops. After the starting step 500, an image is collected with the image capture device 502 in step 502. In the following step 504, the image collected in step 502 is supplied to the computer 112 and there, evaluated by way of an image processing program. The image processing program subsequently examines the image as to whether it contains identifiable features of the loading container 18 or the trailer 18, for example, an upper limiting edge of a wall of the loading container 18 and/or a corner of the loading container 18 and/or a wheel of the trailer 16 or a crop heap collected in the loading container 18 or an inscription or marking placed on the side wall of the loading container 18.

If in step 504, at least one feature of the loading container 18 or the trailer 16 can be identified, step 506 follows, in which the position of the loading container 18 relative to the harvesting machine 10 is calculated, and with information concerning the time of the data collection and the actual advance speed of the harvesting machine 10, which can be produced with the aid of the speed signals of the computer 112 to the speed specification device 116 or by way of a separate sensor, is stored. During the determination of the position of the loading container 18, the computer has recourse to the signals of the sensors 128 and 130, so as to evaluate the position of the image capture device 136 relative to the harvesting machine 10. In step 506, any reference points for the harvesting machine 10 and the loading container 18 can be used, as, for example, the middle points in the forward and lateral direction. Step 508 follows step 506; the question there is whether the position data of at least two images have been stored, if that is not the case, step 502 follows once more; otherwise, step 510.

In step 510, a so-called movement model of the loading container 18 is set up (if step 510 is called up for the first time) or brought up to date with the subsequent executions of step 510). The movement model contains data regarding the position of the loading container 18 and its speed (in the forward and transverse directions) relative to the ground, and preferably, its acceleration (in the forward and transverse directions). This data is calculated from the position data from the preceding recalls of step 506 and the corresponding data for the advance speed of the harvesting machine 10 and the times. Here, only sufficiently updated data are used and old data are cyclically replaced by newly added data. In step 510, a so-called Kalman filter is preferably used, so as to also be able to use less exact data from step 506.

Step 510 is followed by step 512, in which the actuators 46, 48, and 52 are controlled based on the movement model produced in step 510. Primarily, the actuators 46, 48, and 52 are controlled with the aid of the previously evaluated position of the loading container 18, in particular, if the last valid image detection (step 508) does not date back for a long period of time. If the last valid image detection dates back for a longer period of time—that is, step 512 was controlled by step 514 described further below, the speed and perhaps also the acceleration data from the previously executed steps 506 are also increasingly considered, so as to evaluate the position of the loading container 18 and to control the actuators 46, 48, and 52 on the basis thereof. In step 512, the actuators 46, 48, 52 and perhaps 108, 110, 118 are controlled with the aid of extrapolated data for an expected position of the loading container derived from the movement model. If the operator initially aligned the transfer device 40 on the loading container by manual inputs, the transfer device 40 is controlled by the movement model during the harvesting operation in such a way that any changes in the relative position between the harvesting machine 10 and the leading container 18 are compensated. If, on the other hand, there is no initial manual adjustment of the transfer device 40 by the operator, then the computer 112 automatically aligns the transfer device 40 on the loading container 18 during the harvesting operation with the aid of one or more recognized features of the loading container 18 or the transport vehicle 12 in the image of the image capture device 136, and adjusts it during the harvesting operation based on the movement model in such a way that any changes in the relative position between the harvesting machine 10 and the loading container 18 are compensated, in both cases, the same point on the loading container 18 need not be continuously aimed at, but rather, it can be automatically varied according to a suitable loading strategy, so as to fill the loading container successively and uniformly.

It should be noted that in step 512, in a relatively simple embodiment of the disclosure, only the actuators 46, 48, and 52 are controlled, that is, only the transfer device 40 is adjusted relative to the harvesting machine 10. The electronics shown in FIG. 4 on the part of the transport vehicle 12, and the control device 88 with the antennae 74, 84 on the part of the harvesting machine 10 can then be omitted. In an advanced embodiment, these elements are present, however, and if the adjustment range of the transfer device 40 should not be sufficient, the computer 112 can also influence the steering device 108 and/or the speed specification device 110 of the transport vehicle 12 (and/or the speed specification device 116 of the harvesting machine) in such a way that the crops reliably reach the loading container 18. If the harvesting machine 10 is a combine harvester with a nonadjustable transfer device, the actuators 46, 48, 52 would be omitted and only the steering device 108 and/or the speed specification device 110 of the transport vehicle 12 (and/or the speed specification device 116 of the harvesting machine) would be influenced by the computer 112.

Step 512 is again followed by step 502. Since it is now known on which site of the image, the loading container 18 would have to be located, the computer 112 can, in the next call-up of steps 504 and 506, determine with the aid of the movement model, on which site the identifiable features, should be found in the image and initially look for them there, so as to economize on image processing time. Only if they are not found there can the search be extended to the entire image.

If the result in step 504 is that no features of the loading container can be identified in a newly collected image, then step 514 follows. This step asks whether there is a movement model already present and if, since the last updating of the movement image (step 510), no more than a specific time period of, for example, 10 sec has elapsed. If that is not the case (no movement image or the time period has been exceeded), step 516 follows, in which an error message is given and the operator is asked to undertake manual control. Otherwise, step 512 follows as described above.

Having described the preferred embodiment, it will become apparent that various modifications can be made without departing from the scope of the disclosure as defined in the accompanying claims.

The invention claimed is:

1. An arrangement for the automatic transfer of agricultural crops from a harvesting machine to a transport vehicle with a transfer device of the harvesting machine, the transfer device being adapted and operated to discharge crops from the harvesting machine into a loading container of the transport vehicle, the arrangement having:
   an image capture device of the harvesting machine, being adapted and operated to optically detect one or more features of the transport vehicle; and,
   a computer, which, with a transfer of signals, is connected to the image capture device and programmed to control at least one actuator to at least one of adjust the transfer device relative to the harvesting machine and change the position of the loading container relative to the harvesting machine on the basis of signals of the image capture device in such a way that the crops arrive at the loading container;
   wherein the computer is programmed, with the use of the signals of the image capture device, to continuously set up a virtual movement model of the loading container, and in the case that the signals of the image capture device are no longer sufficient to recognize the transport vehicle because of an impairment of the visibility conditions, to control the actuator with the aid of extrapolated data for an expected position of the loading container derived from the movement model, until after a specific time period has elapsed since the last virtual movement model was set up, then the automatic transfer discontinues and an error message is given for the operator to undertake manual control.

2. An arrangement according to claim 1, wherein the image capture device is placed on the transfer device, which is adjusted by way of at least one actuator relative to the harvesting machine, and wherein the computer with the transmission of signals is connected to sensors to determine the alignment of the transfer device relative to the harvesting machine.

3. An arrangement according to claim 1, wherein information regarding the actual speed of the harvesting machine is supplied to the computer.

4. An arrangement according to claim 1, wherein the movement model contains at least one of the actual speed and acceleration of the loading container relative to the ground.

5. An arrangement according to claim 1, wherein the computer is programmed to produce the movement model using a Kalman filter.

6. An arrangement according to claim 1, wherein the computer is programmed, with evaluable signals of the image capture device also, to control the actuator with the aid of data derived from the movement model.

7. An arrangement according to claim 1, wherein the computer is programmed to derive from the movement model a site on an image collected by the image capture device where an identifiable feature of the loading container is located and to search there for the identifiable feature of the loading container.

8. An arrangement according to claim 1, wherein at least one of: the harvester machine and the transport vehicle is self-propelled.

9. A method for the automatic transfer of agricultural crops from a harvesting machine to a transport vehicle having a transfer device which discharges crops from the harvesting machine onto a loading container of the transport vehicle, an image capture device of the harvesting machine, which optically detects one or more features of the transport vehicle, and a computer, which, with a transmission of signals, is connected to the image capture device and controls at least one actuator to one of adjust the transfer device relative to the harvesting machine, and change the position of the loading container relative to the harvesting machine based on signals of the image capture device, in such a way that the crops arrive at the loading container, the method comprising the steps of:

using the signals of the image capture device in the computer to continually set up a virtual movement model of the loading container; and, in the case that because of an impairment of visibility conditions, the signals of the image capture device are no longer sufficient to recognize the transport vehicle, controlling the actuator with the aid of extrapolated data for an expected position of the loading container derived from the movement model, until after a specific time period has elapsed since the last virtual movement model was set up, then the automatic transfer discontinues and an error message is given for the operator to undertake manual control.

10. The arrangement of claim 1, wherein the specific time period is about 10 seconds.

11. The method of claim 9, wherein the specific time period is about 10 seconds.

\* \* \* \* \*